(12) United States Patent  
Fadda

(10) Patent No.: US 8,349,059 B2
(45) Date of Patent: Jan. 8, 2013

(54) POCKETED CYCLONIC SEPARATOR

(75) Inventor: Dani Fadda, Dallas, TX (US)

(73) Assignee: Peerless Manufacturing Co., Dallas, TX (US)

(*) Notice: Subject to any disclaimer, the term of this patent is extended or adjusted under 35 U.S.C. 154(b) by 168 days.

(21) Appl. No.: 12/835,407

(22) Filed: Jul. 13, 2010

(65) Prior Publication Data

US 2012/0012006 A1    Jan. 19, 2012

(51) Int. Cl.
*B01D 19/00* (2006.01)
(52) U.S. Cl. ............. 96/177; 96/207; 96/211; 96/216; 96/217; 55/456; 55/392; 55/426
(58) Field of Classification Search ............ 96/177, 96/207, 209, 211, 216, 217; 95/242, 261, 95/271, 269, 270; 55/456, 392, 426
See application file for complete search history.

(56) References Cited

U.S. PATENT DOCUMENTS

| | | | | |
|---|---|---|---|---|
| 505,977 | A * | 10/1893 | Fletcher | 55/392 |
| 1,055,792 | A * | 3/1913 | Plock | 55/392 |
| 1,521,386 | A * | 12/1924 | Neill | 96/174 |
| 1,661,685 | A * | 3/1928 | Walker | 96/211 |
| 1,770,774 | A * | 7/1930 | Hackett | 96/211 |
| 2,256,524 | A * | 9/1941 | McKelvey | 96/211 |
| 2,642,949 | A * | 6/1953 | Tyskewicz | 96/211 |
| 3,217,469 | A * | 11/1965 | Eckert | 96/211 |
| 3,362,155 | A * | 1/1968 | Driscoll | 60/39.092 |
| 4,081,249 | A * | 3/1978 | Baillie | 422/147 |
| 2004/0025481 | A1* | 2/2004 | Bugli et al. | 55/392 |
| 2004/0098958 | A1* | 5/2004 | Roth et al. | 55/455 |
| 2009/0139938 | A1* | 6/2009 | Larnholm et al. | 210/788 |

* cited by examiner

*Primary Examiner* — Duane Smith
*Assistant Examiner* — Douglas Theisen
(74) *Attorney, Agent, or Firm* — Andrews Kurth LLP

(57) ABSTRACT

A number of pocketed apparatus for separating various materials are described. A pocketed cyclonic separator that includes a cyclone chamber, which includes interior chamber walls, an inlet connected to the cyclone chamber, and one or more pocket separators, located on the interior chamber walls, is described. A substance may be introduced through the inlet into the cyclone chamber so as to create a rotational force sufficient to generate a cyclone in the cyclone chamber. Forces generated by the cyclone will cause heavier material in the substance to move towards the interior chamber walls when in use. The one or more pocket separators define one or more pockets that trap heavier material in the substance when in use.

15 Claims, 8 Drawing Sheets

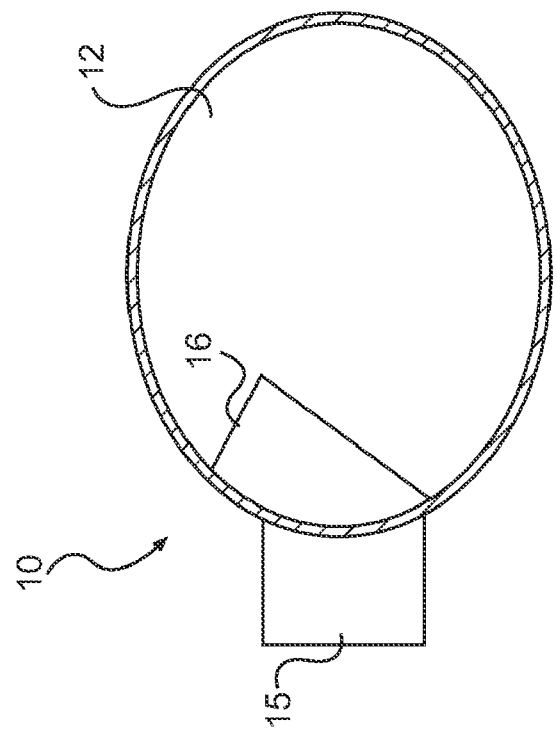
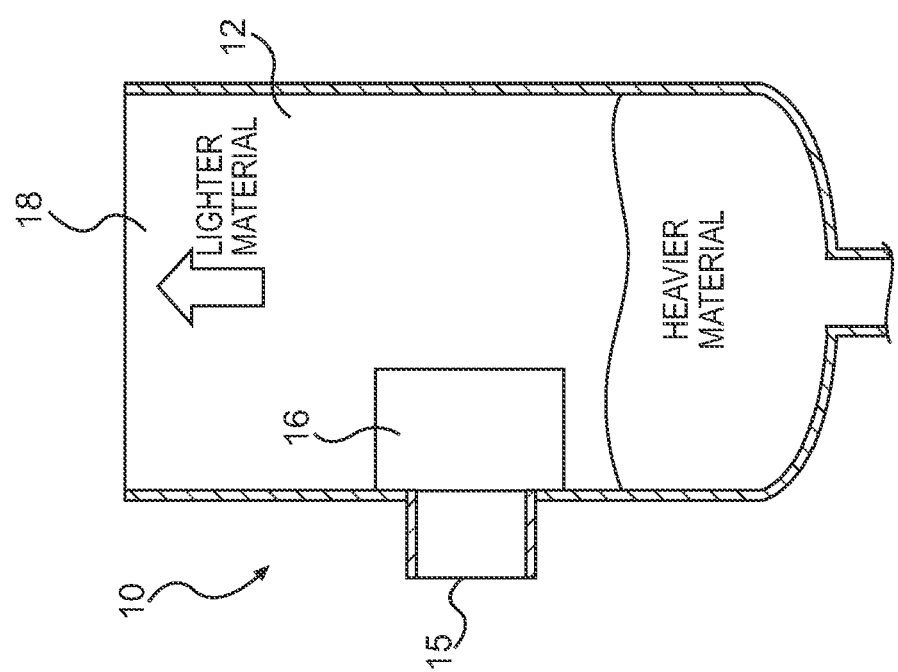

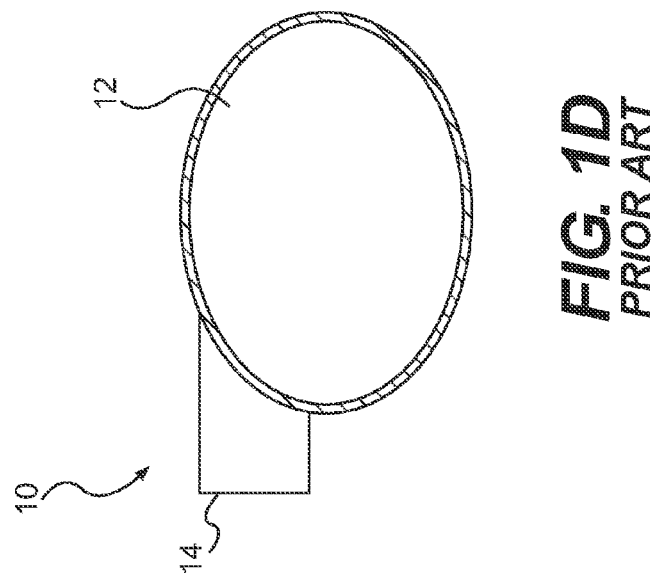
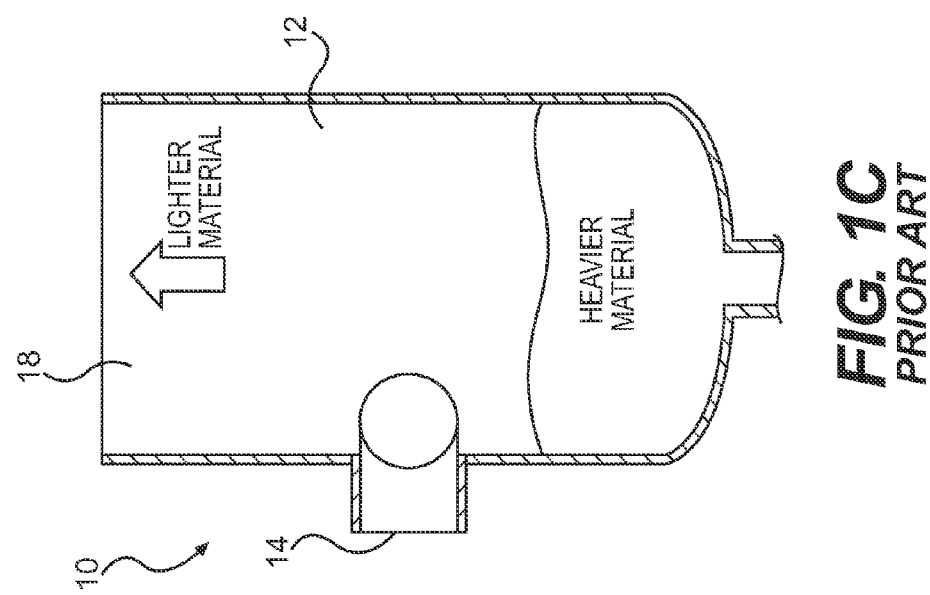

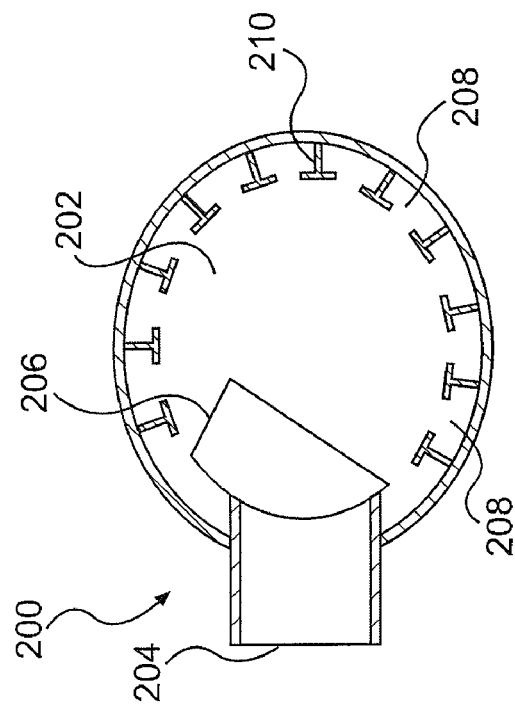
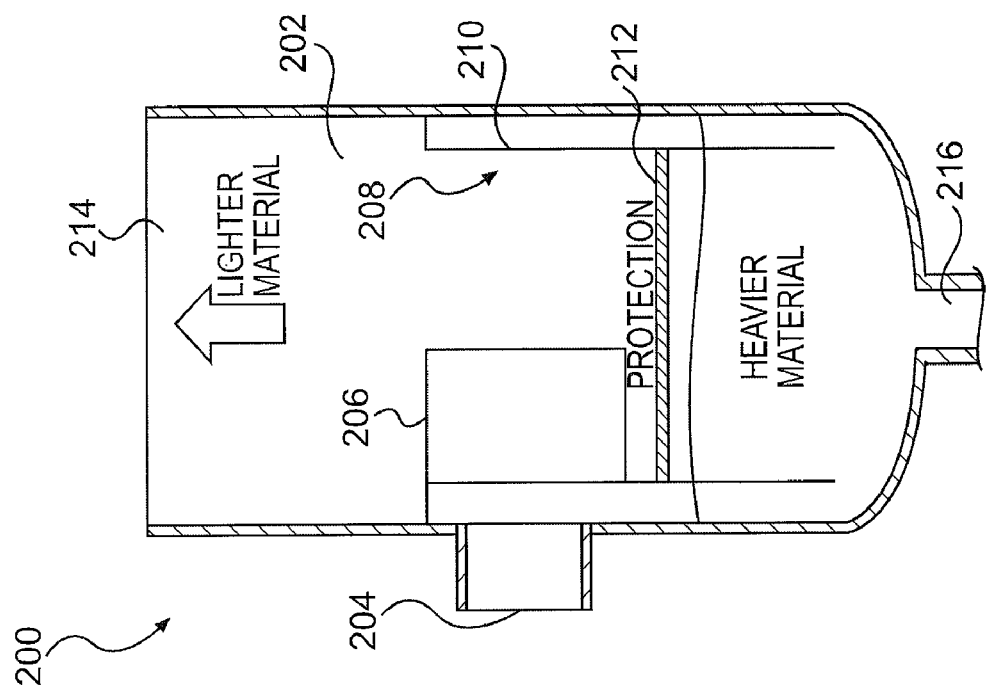

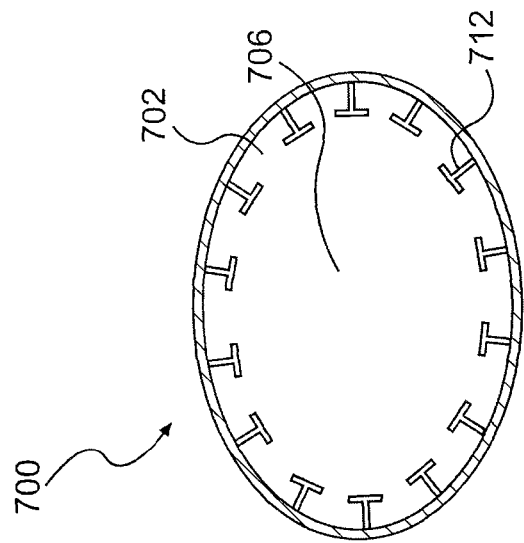
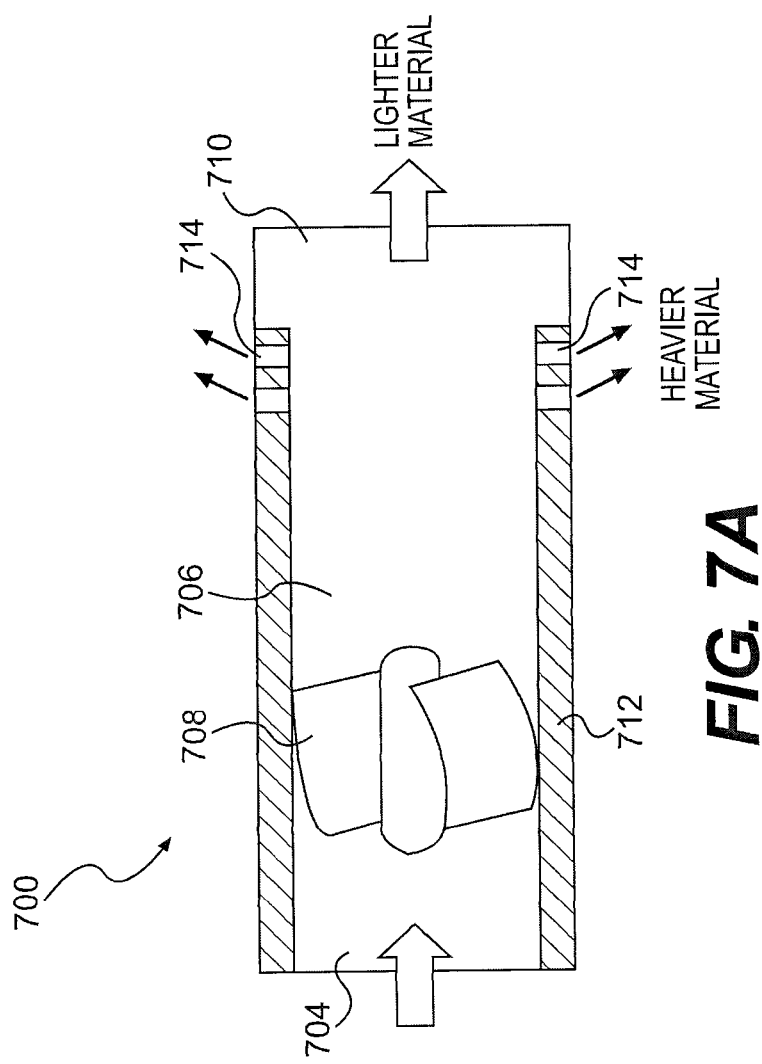
FIG. 7B
FIG. 7A

POCKETED CYCLONIC SEPARATOR

BACKGROUND

A cyclonic or cyclone separator, such as the device 10 shown in FIGS. 1A-1D, is a cylindrical chamber with a tangential entry used to separate heavier material from lighter material. The cyclonic separator is an effective device for removing solids and/or liquids from gas. Likewise, the cyclone separator is used to remove solids from liquids or liquids from liquids. In all applications, the cyclonic separator separates and removes a heavier material from a lighter material.

As shown in FIGS. 1A-1D, existing cyclonic separators include a cylindrical or cyclone chamber 12, a cyclonic inlet 14 or a central inlet 15 with a baffle 16. The shape of the cyclone inlet 14 and baffle 16 causes an inflow substance to spin inside the cyclone chamber 12, creating a swirling flow within the cyclone chamber 12. Centrifugal force resulting from the swirling flow separates the heavier substance, forcing this heavier material (solids or liquids) towards the cyclone chamber 12 wall. The lighter material (gas or lighter liquid) flows upward through a cyclone separator's clean gas outlet 18 and the solids or liquids fall to the bottom of the cyclone chamber 12 where they can be removed, as seen in FIG. 1A and FIG. 1D.

Today, cyclonic separators are found in virtually every industry. For example, cyclonic separators are used in power stations, spray dryers, synthetic detergent production units, and food processing plants (see "Gas Cyclones and Swirl Tubes," Hoffman et al., 2nd edition ( )). Cyclonic separators are also used in natural gas lines around the world. Gas-solid cyclones are also used to prevent pollution. Cyclonic dust collectors have been used to collect solid particles from gas-solid flows and reduce air pollution from chimneys.

It is noted that the prior art generally teaches polishing the interior walls of the cyclone chamber 12 to increase the chamber walls smoothness (Hoffman et al., 2nd edition (Page 49)). It is generally thought that smooth cyclone chamber 12 walls without obstructions will maximize the speed of the cyclone generated within, increasing the separating affect of the cyclonic separator 10.

Unfortunately, in the prior art, cyclone separators, such as cyclonic separator 10, the heavier material close to the cyclone chamber 12 wall are subject to high shear forces. The vertical component of the shear forces pulls some of the heavier material upwards with the lighter material. Further, in applications where the heavier material is a liquid, the shear forces cause liquid shattering and re-entrainment. Specifically, liquid droplets that travel towards the wall get sheared into smaller droplets that are hard to separate. The smaller droplets can exit the prior art cyclonic separator with the gas and cause a reduction in efficiency and capacity.

Improving the capacity of the cyclonic separators as described in this invention will positively benefit most users of these separators.

SUMMARY

Embodiments of a pocketed apparatus, including pocketed cyclonic separator, overcome the disadvantages of the prior art described above. In embodiments, pockets are used at the wall of the cyclone chamber to capture the heavier phase within the pocket where the heavier material is sheltered from the shearing gas velocities.

These advantages and others may be achieved for example by a pocketed cyclonic separator that includes a cyclone chamber, which includes interior chamber walls, an inlet connected to the cyclone chamber, and one or more pocket separators, located on the interior chamber walls. A substance may be introduced through the inlet into the cyclone chamber so as to create a rotational force sufficient to generate a cyclone in the cyclone chamber. Forces generated by the cyclone will cause heavier material in the substance to move towards the interior chamber walls when in use. The one or more pocket separators define one or more pockets that trap heavier material in the substance when in use.

These advantages and others may also be achieved for example by a pocketed cyclone tube. The pocketed cyclone tube includes a cylindrical cyclone chamber, which includes interior chamber walls that slope inwards from a top of the cyclone chamber to a bottom of the cyclone chamber, a plurality of inlets extending from near the top of the cyclone chamber downwards and located on the exterior circumference of the cylindrical cyclone chamber, and a plurality of pocket separators, located around the circumference of the interior chamber walls, that define a plurality of pockets. A substance may be introduced into the cylindrical cyclone chamber through the inlets so as to create a rotational force sufficient to generate a cyclone in the cylindrical cyclone chamber. The forces generated by the cyclone will cause heavier material in the substance to move towards the interior chamber walls when in use. The one or more pockets trap heavier material in the substance when in use.

These advantages and others may also be achieved for example by a pocketed defoamer. The pocketed defoamer includes a defoamer chamber, which includes interior chamber walls, an inlet extending from near the top of the defoamer chamber downwards and located on the exterior circumference of the defoamer chamber, and a plurality of pocket separators, located around the circumference of the interior chamber walls, that define a plurality of pockets. A foamy liquid may be introduced into the defoamer chamber through the inlets so as to create a rotational force sufficient to generate a cyclone in the defoamer chamber. Forces generated by the cyclone will cause liquid and foam of the foam substance to separate and the liquid to move towards the interior chamber walls when in use. The one or more pockets trap liquid when in use.

These advantages and others may also be achieved for example by a pocketed swirl tube. The pocketed swirl tube includes a swirl tube chamber, which includes interior chamber walls, an inlet located at an end of the swirl tube chamber, an outlet located at an end of the swirl tube chamber opposite the inlet, a rotor, and a plurality of pocket separators, located around the circumference of the interior chamber walls, that define a plurality of pockets. A substance may be introduced into the swirl tube chamber through the inlet when in use. The rotor creates a rotational force that drives the substance towards the outlet and which introduces a centrifugal force on the substance, causing heavier material in substance to separate from lighter material in substance and move towards the interior chamber walls when in use. The one or more pockets trap heavier material in the substance when in use.

DETAILED DESCRIPTION

Embodiments are described with reference with to the following figures:

FIGS. 1A-1D are cross-sectional side views and cross-sectional top views of a prior art cyclonic separator.

FIG. 2A is a cross-sectional side view of an embodiment of a pocketed cyclonic separator.

FIG. 2B is a cross-sectional top view an embodiment of a pocketed cyclonic separator.

FIGS. 7A-7B are cross-sectional side and top views of an embodiment of a pocketed horizontal swirl tube.

DETAILED DESCRIPTION

Figure 3:
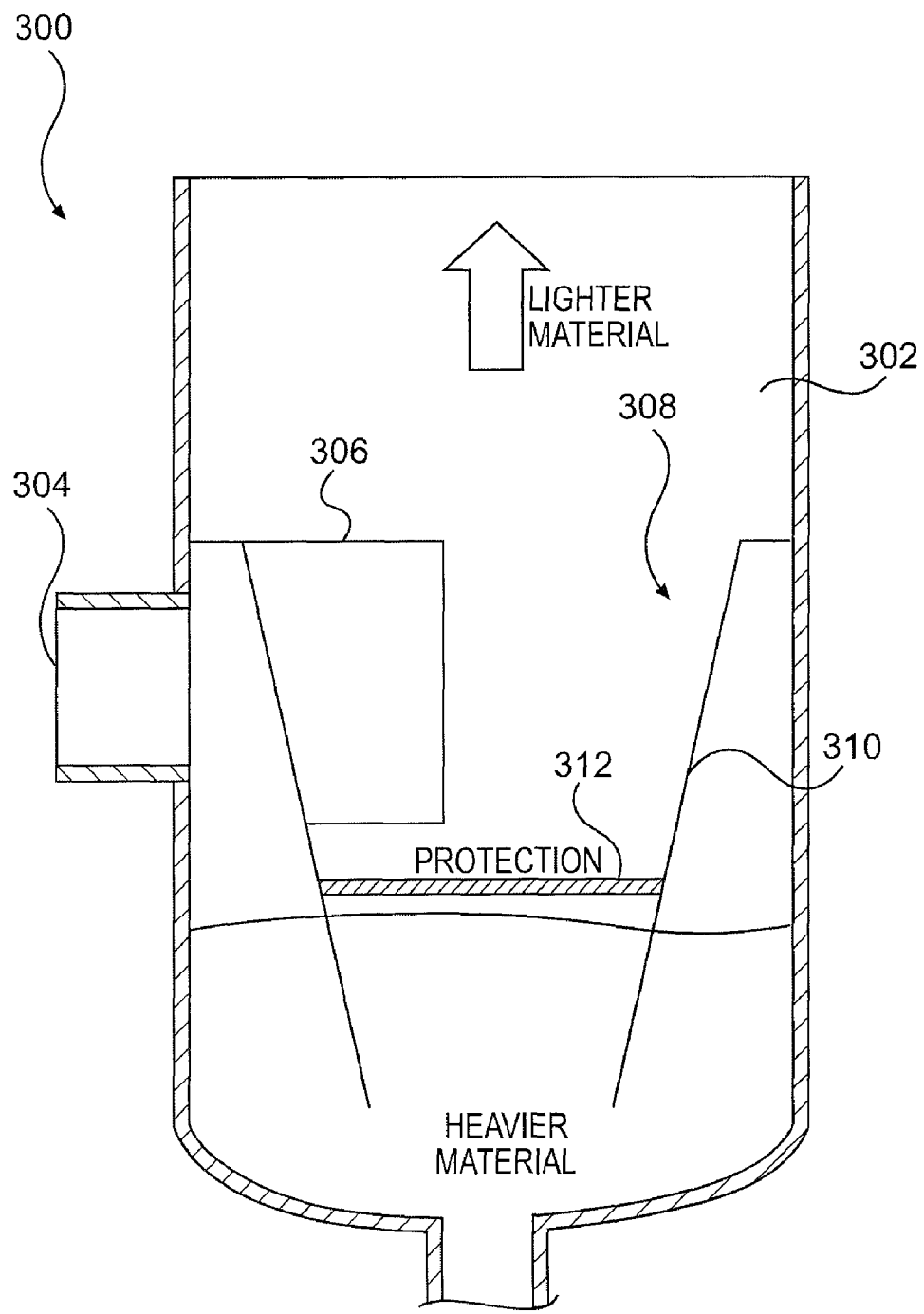
FIG. 3 is a cross-sectional side view of another embodiment of a pocketed cyclonic separator.

Described herein are embodiments of a pocketed cyclonic separator. Embodiments overcome the problems described above. Embodiments remove heavier material from lighter material with more efficiency and higher capacity than prior art cyclonic separators. Embodiments incorporate pockets that trap the heavier material and shelter the heavier material from vertical shear generated by the rotation of the lighter material. Embodiments may be used, for example, to more effectively remove liquid from gas.

With reference now to FIGS. 2A-2B, shown is exemplary embodiment of pocketed cyclonic separator 200. Pocketed cyclonic separator 200 includes cyclone chamber 202, inlet 204, and tangential baffle 206, similar to prior art cyclonic separator 10. Embodiments of pocketed cyclonic separator 200 may also include pockets 208, pocket separators 210 (which form pockets 208), and protection plate 212. In operation, a substance, e.g., which includes liquid and gas material, is introduced into the cyclone chamber 202 through inlet 204 and tangential baffle 206, at an angle and with sufficient speed and pressure so as to create a rotational force sufficient to generate a cyclone within the cyclonic chamber 202. In an embodiment, inlet 204 in a typical cyclonic separator may have a two to four inch (2"-4") diameter. Inlets described herein may have a wide range of diameters, adapted to best function with substance being inserted into separator for separation (or into other devices described herein). Diameter of cyclone chambers described herein are also sized to best function with substance being separated therein. Indeed, size and material used to construct various embodiments described herein, and components thereof, will typically be determined and adapted to best function with substance and volume desired to be processed.

Moreover, embodiments of pocketed cyclonic separator 200 may include a plurality of inlets 204 and tangential baffles 206 around circumference of cyclone chamber 202. Some cyclonic separators have two opposite and equal inlets. The centrifugal force created by the cyclone causes heavier material (e.g., liquid) within the substance to flow to the walls of the cyclone chamber 202, separating the heavier material from lighter material (e.g., gas) in the substance. Gravity then causes the heavier material to fall while the cyclone creates a vertical shear in the lighter material, causing it to rise in the cyclone chamber 202, as shown in FIG. 2A.

Ordinarily, the vertical shear in the lighter material will affect some of the heavier material, causing it to rise with the lighter material. However, the pocket separators 210 act to trap or capture the heavier material within the pockets 208. So captured within the pockets 208, the heavier material is protected or sheltered from the vertical shear affect of the spinning lighter material. With the separated heavier material protected within the pockets 208, gravitational forces can act on the heavier material without the counter vertical shear force, more effectively causing the heavier material to sink to the bottom of the cyclone chamber 202. As shown, pocket separators 210 may extend along cyclone chamber 202 walls for a substantial portion of the height of cyclone chamber 202. In the embodiment shown, pocket separators 210 may extend from top of baffle 206 outlet to bottom of cyclone chamber 202, below protection plate 212. In other words, pocket separators 210 may form pockets 208 that extend from lighter material plane (e.g., gas/vapor plane) into the heavier material plane (e.g., liquid plane).

Protection or separator plate 212 may be a solid horizontal plate that separates the lighter material plane (e.g., gas/vapor plane) from the heavier material plane (e.g., liquid plane), further protecting the heavier material from the vertical shear of the spinning lighter material.

With continued reference to FIG. 2A, pocketed cyclonic separator 200 may further include a lighter material (e.g., gas/vapor) outlet 214 and heavier material (e.g., liquid) outlet 216 for removing the lighter material and heavier material, respectively, from the cyclone chamber 202. The pocketed cyclonic separator 200 may be constructed of virtually any materials used to construct current cyclonic separators. Pocket separators 210 and protector plate 212 may be constructed of the same material as cyclone chamber 202, as part of the same manufacturing process or separately, or made from a different material. If manufactured separately, pocket separators 210 and/or protector plate 212 may be installed by being welded or otherwise bonded or affixed to cyclone chamber 202 walls. Consequently, pocket separators 210 and protector plate 212 may be retrofitted to existing cyclonic separators.

With reference to FIG. 2B, a top, cross-sectional view of an embodiment of pocketed cyclonic separator 200 shows a top view of pocket separators 210. As shown, pocket separators 210 may be T-shaped. Each T-shaped pocket separator 210 forms a double-pocket 208 as shown. Pocket separators 210 may be a variety of other shapes as well, including, for example, L-shaped pocket separators (not shown). L-shaped pocket separators each form a single pocket.

The number of pocket separators 210, and hence pockets 208, and therefore, density of pocket separators 210 (number of pocket separators 210, and hence pockets 208, per unit of diameter of pocketed cyclonic separator 200 may also vary. For example, pocketed cyclonic separator 200 may include five (5) T-separators 210, forming ten pockets 208, ten (10) T-separators 210, forming twenty (20) pockets 208, or other numbers of pocketed separators. Likewise, the size of the pocket separators 210, and hence pockets 208, may vary. Different numbers of pocket separators 210 and pockets 208, different sizes of pocket separators 210 and pockets 208, different shaped pocket separators 210, etc., may work better for different types of heavier materials that are to be removed. The number, size and shape of pocket separators 210 should be chosen with the material to be removed in mind.

Also shown by FIG. 2B, is a smaller effective barrel diameter of pocketed cyclonic separator 200, compared to prior art cyclonic separator 10, where the cyclonic action takes places within the cyclone chamber 202 of pocketed cyclonic separator 200. This smaller effective diameter contributes to improve droplet separation (liquid from gas). This effect is illustrated by the following equation, in which the diameter of a droplet which is removed with one-hundred percent (100%) efficiency is shown to be proportional to the square root of the inner diameter (ID) of the cyclone chamber 202.

$$D_{100\%} = \sqrt{\frac{9\mu_g ID}{4\pi NV(\rho_p - \rho_g)}} \quad (1)$$

In which $D_{100\%}$=droplet diameter that can be removed with 100% efficiency, $\mu_g$=viscosity of gas to be cleaned, ID=inside diameter of the cyclonic separator 200, $\pi$=3.14 (constant), N=number of turns that the particles make inside the cyclonic separator 200, V=inlet gas velocity at the inlet 204 of the cyclonic separator 200, $r_p$=density of particle or droplet that is to be removed, and $r_g$=density of the gas to be cleaned. Consequently, with a smaller diameter, ID, smaller droplets may be removed with 100% efficiency (i.e., all the droplets of the diameter $D_{100\%}$ may be removed), increasing the performance of cyclonic separator 200. The smaller the droplets that may be removed with 100% efficiency, the more effectively the liquid may be removed from the gas. If $D_{100\%}$ is smaller than the minimum droplet size of the liquid being removed, the liquid will be completely removed from the gas.

The pocketed cyclone disclosed here has a higher capacity than a prior art cyclone. Given a certain flow rate of gas and liquid, a pocketed cyclone will be smaller in diameter than a prior art cyclone. Since the diameter is smaller, (a) the vessel is more compact and less expensive. Also, (b) following the equation (1) shown above, the vessel will remove smaller particles or droplets with 100% efficiency.

With reference now to FIG. 3, shown is another embodiment of pocketed cyclonic separator 300. Pocketed cyclonic separator 300 includes cyclone chamber 302, inlet 304, and tangential baffle 306, similar to pocketed cyclonic separator 200. Embodiments of pocketed cyclonic separator 300 may also include sloped pockets 308 defined by sloped pocket separators 310 (which form pockets 308), and protection plate 312. In operation, as above with pocketed cyclonic separator 200, a substance, e.g., which includes liquid and gas material, is introduced into the cyclone chamber 302 through inlet 304 and tangential baffle 306, at an angle and with sufficient speed and pressure so as to create a rotational force sufficient to generate a cyclone within the cyclonic chamber 302. Embodiments of pocketed cyclonic separator 300 may include a plurality of inlets 304 and tangential baffles 306 around circumference of cyclone chamber 302. The centrifugal force created by the cyclone causes heavier material (e.g., liquid) within the substance to flow to the walls of the cyclone chamber 302, separating the heavier material from lighter material (e.g., gas) in the substance. Gravity then causes the heavier material to fall while the cyclone creates a vertical shear in the lighter material, causing it to rise in the cyclone chamber 302, as shown in FIG. 3.

Sloped pocket separators 310 and sloped pockets 308 formed thereby provide a lower funnel (contraction) that significantly improves the performance of pocketed cyclonic separator 300. Contraction of ID of cyclonic separator 300 caused by sloped pocket separators 310 further increases the efficiency of removal, further reducing $D_{100\%}$ of pocketed cyclonic separator 300. Funnel effect of sloped pocket separators 300 also reduces the effect of the vertical shear on the heavier material as it drops to the bottom of pocketed cyclonic separator 300, further improving the efficiency of pocketed cyclonic separator 300. Sloped pocket separators 310 may be a variety of shapes including without limitation T-shaped and L-shaped.

Figure 4B:
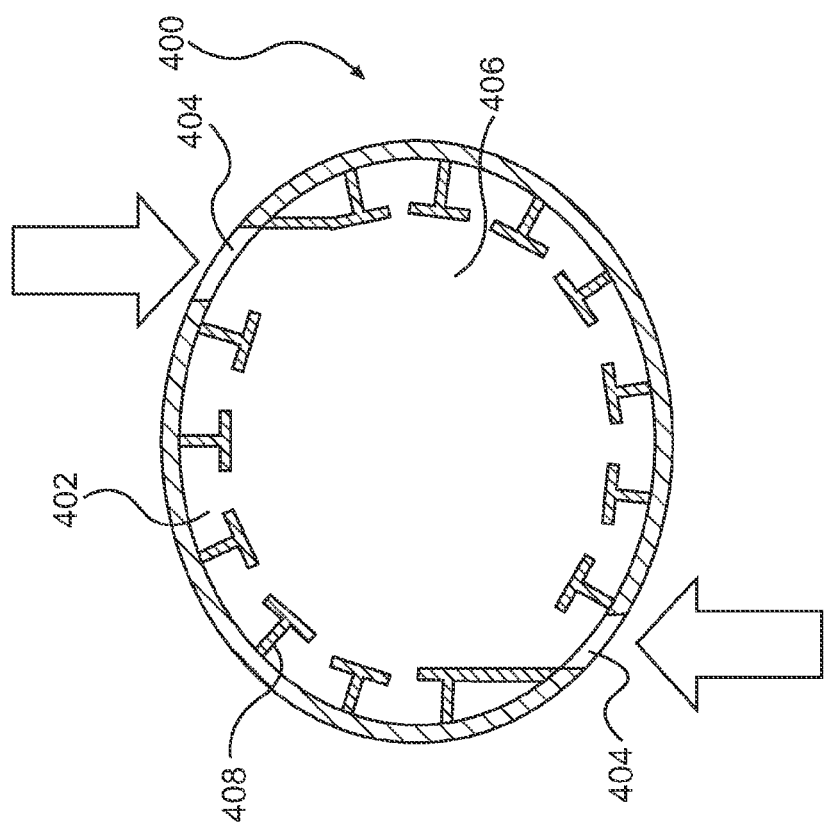
FIGS. 4A-4B are cross-sectional side and top views of an embodiment of a pocketed cyclone tube.
Figure 4A:
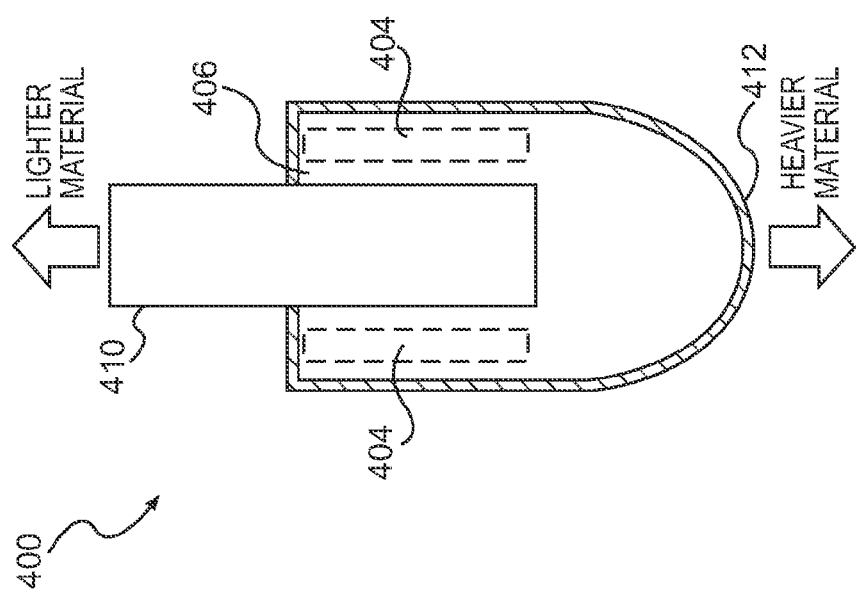

The principles of the pockets described above with reference to cyclonic separators may be effectively applied to other devices as well to increase their efficiency as well. For example, pockets may be applied to cyclone tubes, dry scrubbers, defoamers, tangential inlet baffles, horizontal swirl tubes and vertical swirl tubes. With reference now to FIGS. 4A-4B, shown is an embodiment of a pocketed cyclone tube 400 with pockets 402. Cyclone tube 400 operates in a similar manner as cyclonic separators described herein. A substance is introduced into cyclone chamber 406 through inlets 404, typically on opposing sides of cyclone tube 400, inducing a rotational force on substance. The resulting centrifugal force causes heavier material of the substance to flow to the walls of the cyclone chamber 406, separating the heavier material from lighter material (e.g., gas) in the substance. Pockets 402 formed and defined by pocket separators 408 trap the heavier material. Gravity then causes the heavier material to fall while the cyclone creates a vertical shear in the lighter material, causing it to rise in the cyclone chamber 406, as shown in FIG. 4A. The lighter material exits through an outlet tube 410 while the heavier material falls through a bottom outlet 412. The pockets 402 and pocket separators 408 may line the walls of the cyclone chamber 406, around the outlet tube 410. The pockets 402 and pocket separators 408 may or may not extend down past the outlet tube 410 to the bottom outlet 412, curving inward along the inward slope of the cyclone chamber 406 walls. Pocket separators 408 may be t-shaped, l-shaped, or otherwise shaped to define pockets.

Figure 5B:
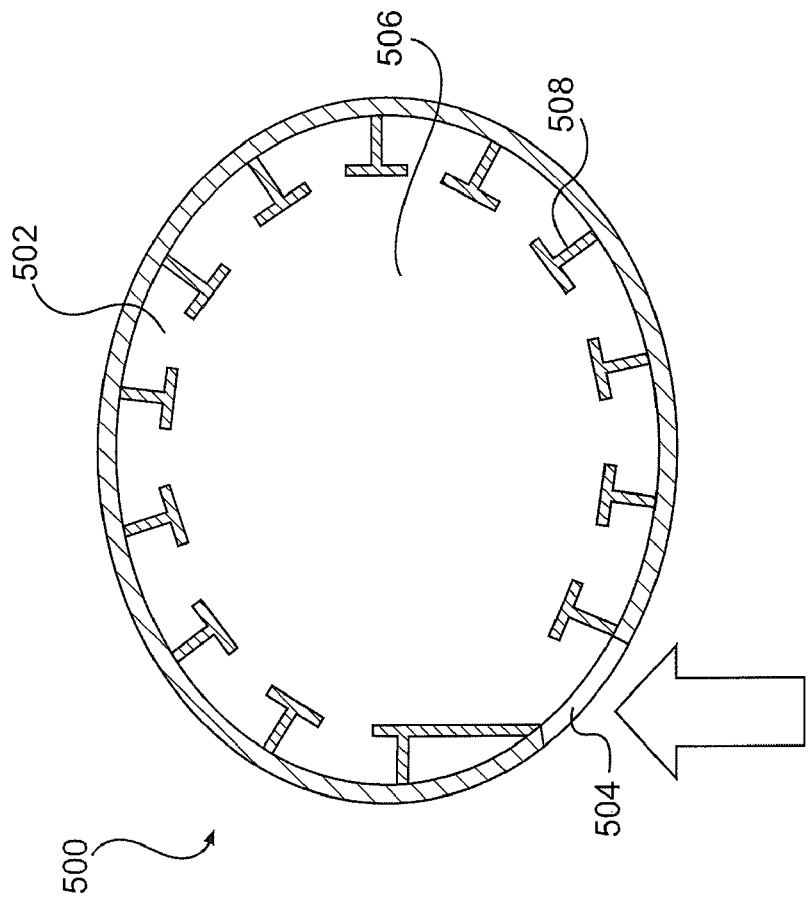
FIGS. 5A-5B are cross-sectional side and top views of an embodiment of a pocketed defoamer.
Figure 5A:
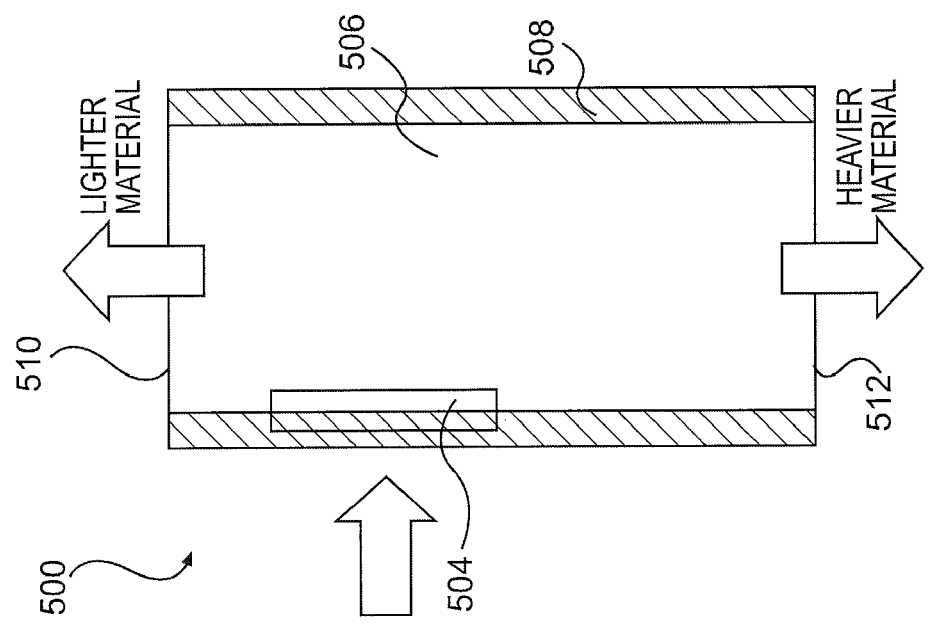

With reference now to FIGS. 5A-5B, shown is an embodiment of a pocketed defoamer 500 with pockets 502. Defoamer 500 may operate a similar manner as cyclonic separators described herein. A substance typically comprising liquid, gas and foam (or the substance may be entirely foam) is introduced through inlet 504 into defoamer chamber 506. Introduction of foamy liquid into defoamer chamber 506 induces a rotational force onto liquid. The defoamer 500 will typically break (pop) the form due to the vertical shear induced by the centrifugal forces inside of the defoamer 500. The broken or popped foam breaks into gas and liquid. The heavier liquid is forced to outside of defoamer chamber 506 (to defoamer chamber 506 walls) by resulting centrifugal force, where it is trapped by pockets 502 formed by pocket separators 508. Vertical shear causes the gas (lighter material) to be lifted away from the liquid while gravity causes liquid to fall away. Gas may exit through upper outlet 510 while liquid falls away through lower outlet 512. Pocket separators 508 may be t-shaped, l-shaped, or otherwise shaped to define pockets. Pockets 502 and pocket separators 508 may line entirety of defoamer chamber 506 walls or only a portion.

Figure 6B:
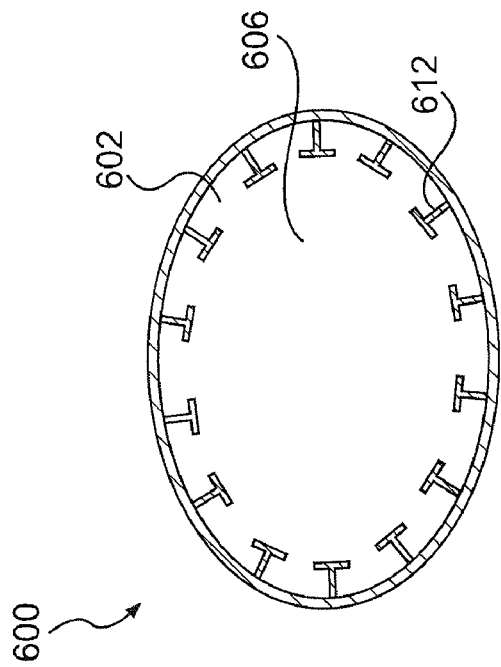
FIGS. 6A-6B are cross-sectional side and top views of an embodiment of a pocketed vertical swirl tube.
Figure 6A:
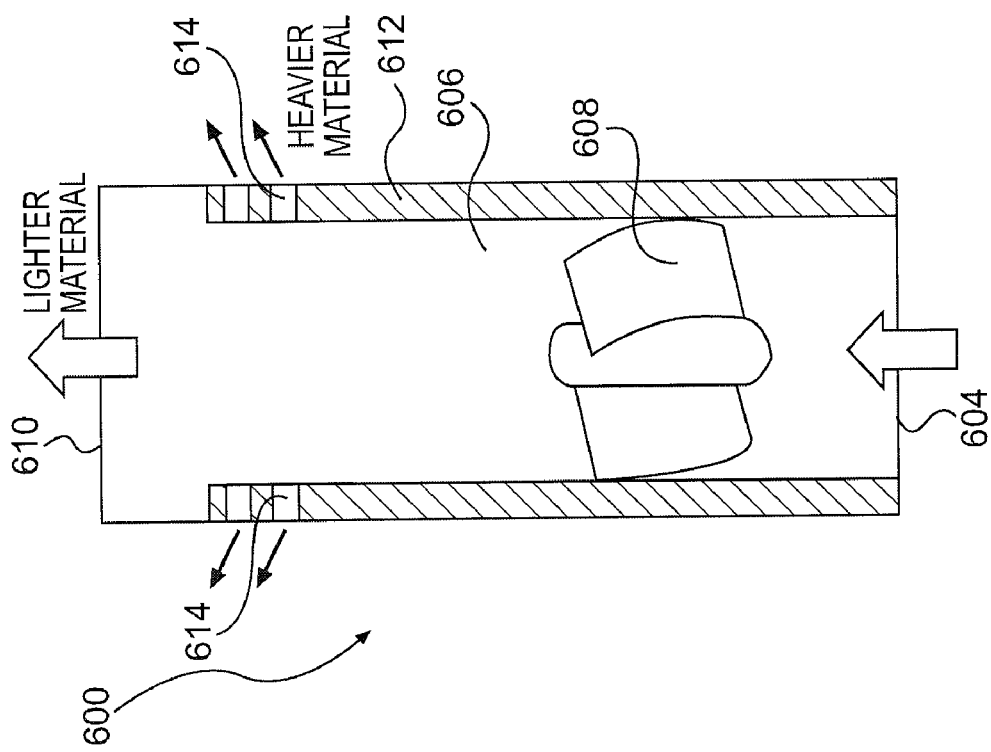

With reference now to FIGS. 6A-6B, shown is an embodiment of a pocketed vertical swirl tube 600 with pockets 602. As shown, inlet 604 through which substance is introduced to swirl tube chamber 606 is at bottom of vertical swirl tube 600. A bladed or other rotor 608 in the swirl tube chamber 606 introduces a rotational force onto substance. The resulting centrifugal force causes heavier material in substance to separate from lighter material in substance and move to walls of swirl tube chamber 606. The rotor 608 also creates force driving substance upwards towards outlet 610 at top of vertical swirl tube 600. Pockets 602 defined by pocket separators 612 line the walls of swirl tube chamber 606. The heavier material is trapped by pockets 602. Although trapped by pockets 602, heavier material is driven upward by force created by rotor 608. Heavier material exits swirl tube chamber 606 through side heavier material outlets 614 at top of and along exterior of swirl tube chamber 606. Lighter material exits through outlet 610. Pockets 602 and pocket separators 610 may line entirety of swirl tube chamber 606 walls or only a portion. Pocket separators 610 may be t-shaped, l-shaped, or otherwise shaped to define pockets.

With reference now to FIGS. 7A-7B, shown is an embodiment of a pocketed horizontal swirl tube 700 with pockets 702. As shown, inlet 704 through which substance is introduced to swirl tube chamber 706 is at one end of vertical swirl tube 700. A bladed rotor 708 in the swirl tube chamber 706 introduces a rotational force onto substance. The resulting centrifugal force causes heavier material in substance to separate from lighter material in substance and move to walls of swirl tube chamber 706. The rotor 708 also creates force driving substance horizontally towards outlet 710 at top of horizontal swirl tube 700. Pockets 6702 defined by pocket separators 712 line the walls of swirl tube chamber 706. The heavier material is trapped by pockets 702. Although trapped by pockets 702, heavier material is driven horizontally by force created by rotor 708. Heavier material exits swirl tube chamber 706 through outlets 714 at end opposite inlet 704 of and along exterior of swirl tube chamber 706. Lighter material exits through outlet 710. Pockets 702 and pocket separators 710 may line entirety of swirl tube chamber 706 walls or only a portion. Pocket separators 710 may be t-shaped, l-shaped, or otherwise shaped to define pockets.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A double-pocketed cyclonic separator comprising:
   a cyclone chamber, which includes interior chamber walls;
   one or more inlets connected to the cyclone chamber and through which a substance may be introduced into the cyclone chamber so as to create a rotational force sufficient to generate a cyclone in the cyclone chamber, wherein forces generated by the cyclone will cause heavier material in the substance to move towards the interior chamber walls when in use;
   one or more tangential baffles connected to the one or more inlets that cause the substance to be introduced into the cyclone chamber tangentially to the inlets; and
   a plurality of T-shaped pocket separators, located on the interior chamber walls, wherein each T-shaped pocket separator defines opposite facing double pockets, wherein the opposite facing double pockets trap heavier material in the substance when in use.

2. The double-pocketed cyclonic separator of claim 1 wherein the T-shaped pocket separators extend from the inlet substantially to a bottom of the cyclone chamber.

3. The double-pocketed cyclonic separator of claim 1 wherein the T-shaped pocket separators slant inwards away from interior chamber walls as the T-shaped pocket separators extend downwards from the inlet, defining an inverted cone-shape space in an interior of the cyclone chamber.

4. The double-pocketed cyclonic separator of claim 1 wherein the T-shaped pocket separators define a plurality of pockets around a circumference of the cyclone chamber.

5. The double-pocketed cyclonic separator of claim 1 further comprising a protection plate positioned below the inlet and covering a space in a center of the cyclone chamber defined by the T-shaped pocket separators, wherein the protection plate prevents heavier material from being driven upwards by vertical shear when in use.

6. The double-pocketed cyclonic separator of claim 1 further comprising an outlet at a top of the cyclone chamber through which lighter material exits the cyclone chamber when in use.

7. The double-pocketed cyclonic separator of claim 1 further comprising an outlet at a bottom of the cyclone chamber through which heavier material exits the cyclone chamber when in use.

8. The double-pocketed cyclonic separator of claim 1 wherein the cyclone chamber is cylindrical.

9. A double-pocketed cyclone tube comprising:
   a cylindrical cyclone chamber, which includes interior chamber walls that slope inwards from a top of the cyclone chamber to a bottom of the cyclone chamber;
   a plurality of inlets extending from near the top of the cyclone chamber downwards and located on the exterior circumference of the cylindrical cyclone chamber, through which a substance may be introduced into the cylindrical cyclone chamber so as to create a rotational force sufficient to generate a cyclone in the cylindrical cyclone chamber, wherein forces generated by the cyclone will cause heavier material in the substance to move towards the interior chamber walls when in use; and
   a plurality of T-shaped pocket separators, located around the circumference of the interior chamber walls, that define a plurality of opposite-facing, double pockets, wherein the plurality of double pockets trap heavier material in the substance when in use.

10. The double-pocketed cyclone tube of claim 9 further comprising a tube through which lighter material is output when in use.

11. A double-pocketed defoamer comprising:
   a defoamer chamber, which includes interior chamber walls;
   an inlet extending from near the top of the defoamer chamber downwards and located on the exterior circumference of the defoamer chamber, through which a foamy liquid may be introduced into the defoamer chamber so as to create a rotational force sufficient to generate a cyclone in the defoamer chamber, wherein forces generated by the cyclone will cause liquid and foam of the foam substance to separate and the liquid to move towards the interior chamber walls when in use; and
   a plurality of T-shaped pocket separators, located around the circumference of the interior chamber walls, that define a plurality of opposite-facing, double pockets, wherein the plurality of double pockets trap liquid when in use.

12. A pocketed swirl tube comprising:
   a swirl tube chamber, which includes interior chamber walls;
   an inlet located at an end of the swirl tube chamber and through which a substance may be introduced into the swirl tube chamber when in use;
   an outlet located at an end of the swirl tube chamber opposite the inlet;
   a rotor that creates a rotational force that drives the substance towards the outlet and which introduces a centrifugal force on the substance, causing heavier material in substance to separate from lighter material in substance and move towards the interior chamber walls when in use; and a plurality of pocket separators, located around the circumference of the interior chamber walls, that define a plurality of pockets, wherein the one or more pockets trap heavier material in the substance when in use.

13. The pocketed swirl tube of claim 12 wherein the pocketed swirl tube is a vertical pocketed swirl tube.

14. The pocketed swirl tube of claim 12 wherein the pocketed swirl tube is a horizontal pocketed swirl tube.

15. The double-pocketed cyclonic separator of claim 1 wherein the T-shaped pocket separators extend downward from the inlet for some portion of the height of the cyclone chamber.

\* \* \* \* \*